United States Patent
Vogt

(10) Patent No.: US 7,332,208 B2
(45) Date of Patent: Feb. 19, 2008

(54) CARD

(75) Inventor: Werner Vogt, Remetschwil (CH)

(73) Assignee: Interlock AG, Geroldswil (CH)

( * ) Notice: Subject to any disclaimer, the term of this patent is extended or adjusted under 35 U.S.C. 154(b) by 109 days.

(21) Appl. No.: 10/515,909

(22) PCT Filed: May 27, 2003

(86) PCT No.: PCT/IB03/02039

§ 371 (c)(1),
(2), (4) Date: Feb. 4, 2005

(87) PCT Pub. No.: WO03/099555

PCT Pub. Date: Dec. 4, 2003

(65) Prior Publication Data

US 2005/0118385 A1   Jun. 2, 2005

(30) Foreign Application Priority Data

May 27, 2002   (DE) .......................... 202 08 278 U

(51) Int. Cl.
*B32B 3/02* (2006.01)

(52) U.S. Cl. .......................... 428/81; 428/203; 283/109
(58) Field of Classification Search .................. 428/77, 428/81, 203; 283/109, 110; 156/308.2
See application file for complete search history.

(56) References Cited

U.S. PATENT DOCUMENTS 7,008,500 B2 * 3/2006 Smulson ..................... 156/252

FOREIGN PATENT DOCUMENTS

| DE | 42 06 742 A1 | 9/1993 |
| EP | 0 669 214 A1 | 8/1995 |

* cited by examiner

*Primary Examiner*—Alexander S. Thomas
(74) *Attorney, Agent, or Firm*—Klaus P. Stoffel; Wolff & Samson PC

(57) ABSTRACT

The invention relates to a card having a card base body (20) and a plastic layer (30) joined thereto. According to the invention, the delimiting edge(s) of the plastic layer (30) is/are set back from the card edge(s) and comprise(s) projections that terminate with the edge(s) of the card base body (20) in a flush manner.

4 Claims, 1 Drawing Sheet

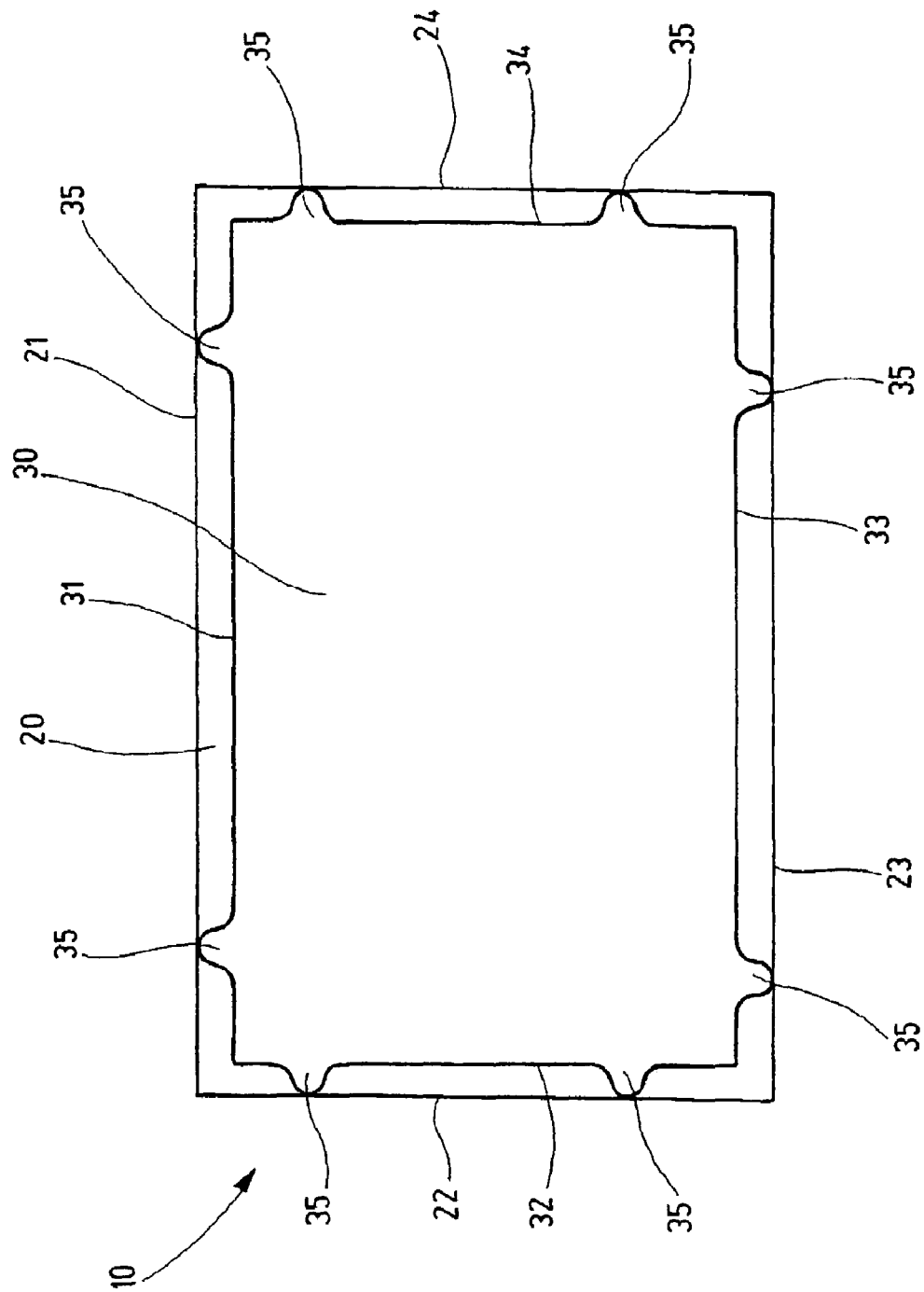

CARD

PRIORITY CLAIM

This is a 35 U.S.C. §371 National Stage of International Application No. PCT/IB2003/02039, filed on May 27, 2003. Priority is claimed on that application and on the following application:

Country: Germany, Application No. 202 08 278.4 Filed: May 27, 2002.

The invention pertains to a card, comprising at least one layer of laminate and a layer of plastic, preferably printed, which is bonded to the laminate.

BACKGROUND OF THE INVENTION

A card of this type is described in, for example, EP 0 669 214 B1. This card comprises a finished base card, which has been die-cut to the final dimensions. A printed plastic layer, also with its final dimensions, is laid on the base card and attached to it by welding. The base card consisting of at least one layer of laminate and the printed plastic layer arranged on top of it have the same final dimensions. In many cases, these types of cards are also produced by laminating a base card and, for example, a piece of printed plastic film together and by die cutting the composite card thus obtained to bring it to its final dimensions. In the case of this card as well, the edges of the plastic film terminates precisely at the edge of the card.

Terminating the edges of the plastic film so that its edges are flush with the edges of the card is problematic with respect to the production of these cards. Either the plastic film must be of exactly the same size as the card and be positioned very precisely thereon, or the plastic film and the card must undergo a final die cutting operation.

Terminating the edges of the plastic film so that its edges are flush with the edges of the card is also problematic because of the possibility that frequent use of the card can lead to damage to the plastic film precisely in the area of the edges. Such damage can even make it possible for the plastic film to peel off at least partially from the card. Information printed on the plastic film can therefore be lost, for example, and damage of this type to the card is also undesirable from an aesthetic standpoint.

SUMMARY OF THE INVENTION

The invention is therefore based on the problem of improving a card of the general type in question so that it can be produced easily, so that the previously described problems can be eliminated, and especially so that the plastic layer on the card cannot be damaged or peeled off even under conditions of frequent use.

This task is accomplished according to the invention with a card of the type described above in that the boundary edge/edges of the plastic layer is/are set back from the edge/edges of the card and has/have projections, which terminate flush with the edge/edges of the card.

Because the plastic layer has a smaller surface area than the card, damage to the plastic layer is prevented precisely in the edge areas of the card subject to especially severe stress. The projections make it possible to position the plastic layer precisely on the card during the production process, and a much smaller degree of precision is required than for the cards according to the state of the art, for which the plastic layer is precut to the final dimensions of the card.

Both the card and the plastic layer preferably also have a rectangular shape with preferably rounded corners, where the edges of the plastic layer are set back from the edges of the card and where at least two projections are provided on each of the four sides of the rectangle formed by the plastic layer. This design of the plastic layer makes it possible to position it on the laminate layer in an especially advantageous manner.

The projections advantageously have a rounded form. The rounded form makes it possible for the plastic layer to make more-or-less point-wise contact with the edges of the laminate layer, which reduces the danger of damage to the plastic layer and the danger of its separation to a minimum.

The plastic layer can be printed in a mirror-reversed manner on the side facing the card body or in a non-mirror-reversed manner on the side facing away from the card body.

The card base body and the plastic layer are preferably welded together, with the result that it is practically impossible for the plastic layer to come loose from the card base body.

Additional advantages and features of the invention are the object of the following description and of the drawings, which show an exemplary embodiment of the invention.

BRIEF DESCRIPTION OF THE DRAWINGS

The FIGURE shows a schematic diagram of a card according to the invention.

DETAILED DESCRIPTION OF THE INVENTION

A card, designated overall by the number 10, has a card base body 20, which comprises at least one layer of laminate, and a plastic layer 30, which is welded or laminated to the base body. The minimum of one layer of laminate forming the card base body 20 has an essentially rectangular shape with 4 edges 21, 22, 23, 24, each of which forms one side of the rectangle. The plastic layer 30 also has a rectangular shape conforming to that of the card base body 20 with the edges 31, 32, 33, 34, which also form the sides of a rectangle.

Projections 35 are provided on each of the edges 31, 32, 33, 34 of the plastic layer, such as a printed piece of PVC film. Two such projections, for example, can be provided on each of the four sides. These projections are used to position the plastic layer on the card base body 20 during the production of the card 10. These projections 35 have a rounded, possibly circular, shape. Because of this rounded, possibly circular, shape, it is ensured that, in practice, the projections of the plastic layer 30 terminate flush with the edges 21, 22, 23, 24 of the card base body 20 at only a single point in each case. This prevents damage to the plastic layer as a result of, for example, scuffing, which can occur especially when the card 10 is subjected to very intensive use. Setting the edges 31, 32, 33, 34 of the plastic layer 30 back from the edges 21, 22, 23, 24 of the base body 20 of the card is also a very effective way of preventing the plastic layer 30 that is welded or laminated to the card base body 20 from coming loose from the card base body 20.

The plastic layer 30 can be printed on the side facing the base body 20 or on the side facing away from it. It can also be provided, however, merely as protection for the previously printed card base body 20.

The plastic layer 30 and the card base body 20 are welded together to prevent the plastic layer 30 from coming loose from the card base body 20.

The invention claimed is:

1. A card comprising a base body and a plastic layer welded to the base body, the plastic layer having at least one boundary edge that is set back from an edge of the base body, and further having projections, which terminate flush with the edge of the base body after welding has taken place, wherein the base body and the plastic layer each have a rectangular shape, the edges of the rectangle of the plastic layer are set back from the edges of the rectangle of the base body, at least two of the projections being provided on each side edge of the plastic layer, wherein the projections have a rounded shape so that the projections each terminate at a single point with the edge of the base body.

2. The card according to claim 1, wherein the plastic layer is printed on a side facing the base body.

3. The card according to claim 1, wherein the plastic layer is printed on a side facing away from the base body.

4. The card according to claim 1, wherein the base body and the plastic layer have rounded corners.

* * * * *